(12) United States Patent
Garza, Jr.

(10) Patent No.: US 7,581,736 B1
(45) Date of Patent: Sep. 1, 2009

(54) PORTABLE TOOL BOX WITH EXTENDABLE CENTRAL LIFTING HANDLE

(76) Inventor: Edward R. Garza, Jr., 2423 Klein Rd., San Jose, CA (US) 95148

( * ) Notice: Subject to any disclaimer, the term of this patent is extended or adjusted under 35 U.S.C. 154(b) by 261 days.

(21) Appl. No.: 11/562,848

(22) Filed: Nov. 22, 2006

(51) Int. Cl.
B62B 3/00 (2006.01)

(52) U.S. Cl. .............................. 280/47.371; 280/47.34; 280/79.2; 280/79.11

(58) Field of Classification Search ................ 280/79.2, 280/79.3, 47.34, 371, 7.315, 79.11, 32.5, 280/32.6; D34/19, 23
See application file for complete search history.

(56) References Cited

U.S. PATENT DOCUMENTS

| | | | | |
|---|---|---|---|---|
| 1,612,980 A | * | 1/1927 | Royal | 280/79.2 |
| 1,820,466 A | * | 8/1931 | Chaim | 280/42 |
| 1,854,777 A | * | 4/1932 | Bales | 211/126.15 |
| 2,798,732 A | * | 7/1957 | Craig | 280/641 |
| 2,819,938 A | * | 1/1958 | Zerver | 312/201 |
| 2,830,825 A | * | 4/1958 | Webber et al. | 280/79.3 |
| 3,314,688 A | * | 4/1967 | Guegold | 280/655.1 |
| 3,339,938 A | * | 9/1967 | Edmisson | 280/79.3 |
| 4,000,841 A | * | 1/1977 | Bachli | 206/509 |
| 4,119,044 A | * | 10/1978 | Hines | 108/27 |
| 4,220,343 A | * | 9/1980 | Robinson | 280/33.998 |
| 4,248,442 A | * | 2/1981 | Barrett | 280/33.998 |
| 4,460,085 A | * | 7/1984 | Jantzen | 206/349 |
| D296,026 S | * | 5/1988 | Sugarman et al. | D34/25 |
| 4,795,180 A | * | 1/1989 | Polcyn | 280/79.11 |
| 4,880,248 A | * | 11/1989 | Elmer | 280/47.35 |
| 4,913,453 A | * | 4/1990 | Wagner et al. | 280/79.2 |
| 5,002,293 A | * | 3/1991 | Gottselig | 280/47.35 |
| 5,088,014 A | | 2/1992 | Boughey | |
| 5,092,616 A | * | 3/1992 | McKinney | 280/87.043 |
| 5,219,446 A | * | 6/1993 | Klepac | 362/154 |
| D341,692 S | * | 11/1993 | Klepac | D3/315 |
| 5,306,029 A | * | 4/1994 | Kaiser, II | 280/30 |
| 5,378,005 A | * | 1/1995 | Norton | 280/47.26 |
| 5,413,544 A | * | 5/1995 | Fiore | 482/68 |
| 5,480,170 A | * | 1/1996 | Kaiser, II | 280/30 |
| 5,566,961 A | * | 10/1996 | Snell et al. | 280/47.35 |
| 5,624,029 A | | 4/1997 | Shih | |
| 5,685,421 A | | 11/1997 | Gilmore | |
| 5,836,446 A | * | 11/1998 | Varnom | 206/373 |
| 5,853,180 A | * | 12/1998 | Taylor | 280/32.6 |
| 5,879,072 A | | 3/1999 | Huang | |
| 5,927,745 A | * | 7/1999 | Cunningham | 280/652 |
| 6,216,488 B1 | * | 4/2001 | Rucker | 62/457.7 |
| 6,264,220 B1 | * | 7/2001 | Pierce et al. | 280/79.3 |
| 6,267,240 B1 | | 7/2001 | Callaway | |
| 6,318,713 B1 | * | 11/2001 | Levi | 269/139 |
| 6,347,847 B1 | * | 2/2002 | Tiramani et al. | 312/108 |
| 6,520,609 B1 | * | 2/2003 | Beauregard et al. | 312/235.2 |
| 6,615,973 B2 | * | 9/2003 | Fritter | 198/498 |

(Continued)

Primary Examiner—Christopher P Ellis
Assistant Examiner—Vaughn T Coolman

(57) ABSTRACT

A portable tool box for facilitating transporting of tools to a desired location through a crawl space includes a container receiving tools to be transported. The container includes a base wall and a perimeter wall extending upwardly from the base wall to define an interior space of the container. The interior space of the container receives the tools when the tools are positioned in the container. A top edge of the base wall defines an open end of the container. A lifting handle is coupled to the container. The lifting handle is graspable to permit lifting of the container when the container is to be transported. Each of a plurality of wheels is rotatably coupled to the container. Each of the wheels rolls across a support surface to facilitate transportation of the container across the support surface.

10 Claims, 3 Drawing Sheets

U.S. PATENT DOCUMENTS

| | | | |
|---|---|---|---|
| 6,669,214 B1* | 12/2003 | Domis | 280/47.35 |
| 6,761,366 B1* | 7/2004 | Klemmensen et al. | 280/47.26 |
| 6,796,565 B2* | 9/2004 | Choi et al. | 280/47.35 |
| 7,273,215 B1* | 9/2007 | Smith | 280/32.6 |
| 7,360,784 B2* | 4/2008 | Stewart et al. | 280/656 |
| 2005/0236788 A1* | 10/2005 | Kellogg | 280/79.2 |
| 2006/0006621 A1* | 1/2006 | Santa Cruz et al. | 280/79.3 |
| 2006/0027475 A1* | 2/2006 | Gleason et al. | 206/373 |
| 2006/0108192 A1* | 5/2006 | Bastarache | 190/18 A |
| 2006/0144732 A1* | 7/2006 | Kaplan et al. | 206/349 |
| 2007/0012694 A1* | 1/2007 | Duvigneau | 220/4.27 |
| 2007/0056868 A1* | 3/2007 | Godshaw et al. | 206/373 |
| 2007/0257455 A1* | 11/2007 | Cho | 280/47.26 |
| 2008/0079227 A1* | 4/2008 | Angellotto | 280/47.26 |

* cited by examiner

PORTABLE TOOL BOX WITH EXTENDABLE CENTRAL LIFTING HANDLE

BACKGROUND OF THE INVENTION

1. Field of the Invention

The present invention relates to tool boxes and more particularly pertains to a new tool box for facilitating transporting of tools to a desired location through a crawl space.

2. Description of the Prior Art

The use of tool boxes is known in the prior art. While these devices fulfill their respective, particular objectives and requirements, the need remains for a device that has certain improved features that allow the device to be pulled along a surface in areas where vertical clearance is restricted. Additionally, a light assembly on the device can be adjusted to direct light to a desired area to be illuminated.

SUMMARY OF THE INVENTION

The present invention meets the needs presented above by generally comprising a container receiving tools to be transported. The container includes a base wall and a perimeter wall extending upwardly from the base wall to define an interior space of the container. The interior space of the container receives the tools when the tools are positioned in the container. A top edge of the base wall defines an open end of the container. A lifting handle is coupled to the container. The lifting handle is graspable to permit lifting of the container when the container is to be transported. Each of a plurality of wheels is rotatably coupled to the container. Each of the wheels rolls across a support surface to facilitate transportation of the container across the support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
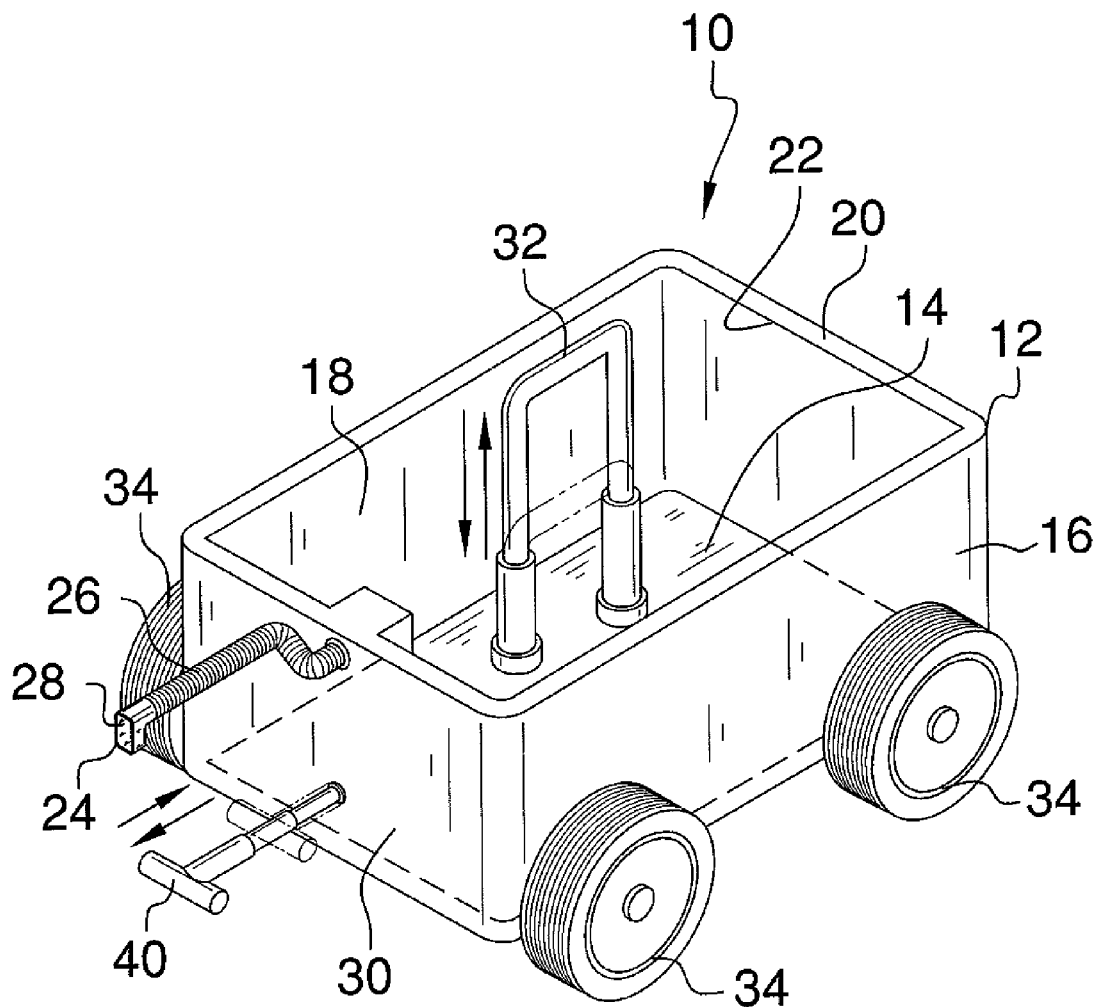
FIG. 1 is a perspective view of a portable tool box according to the present invention.
Figure 2:
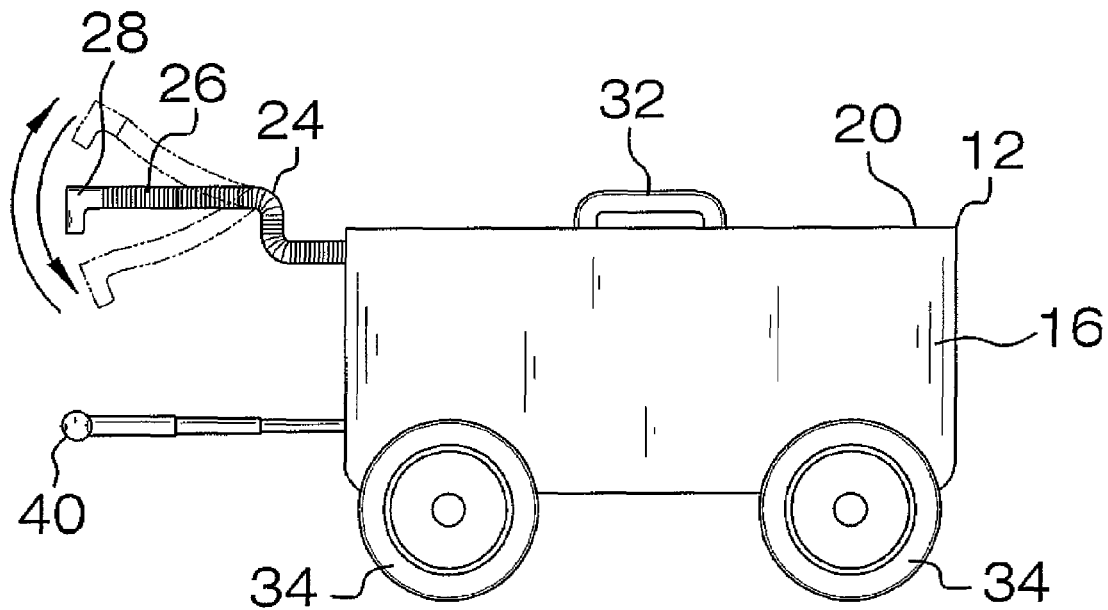
FIG. 2 is a side view of the present invention.
Figure 3:
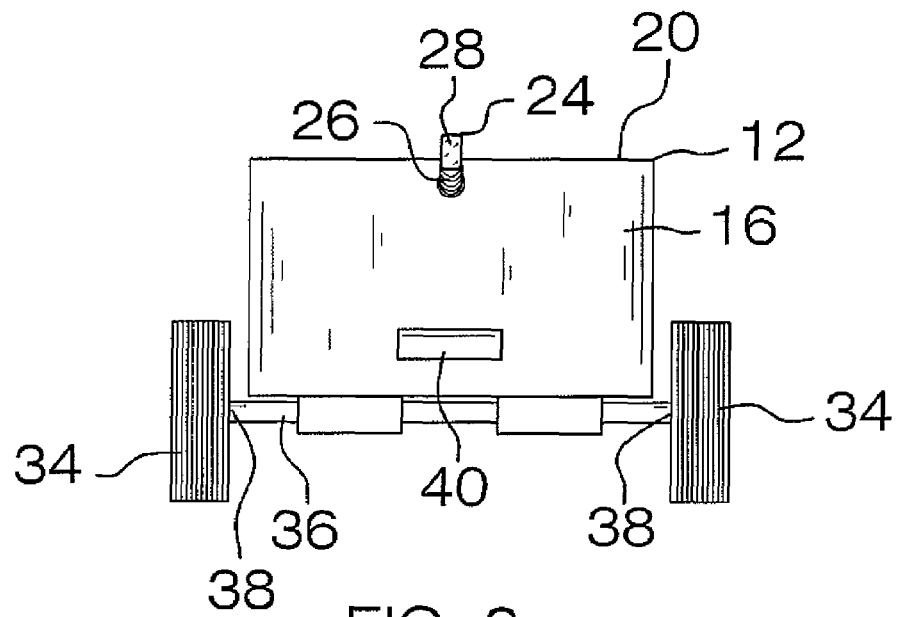
FIG. 3 is a front view of the present invention.
Figure 4:
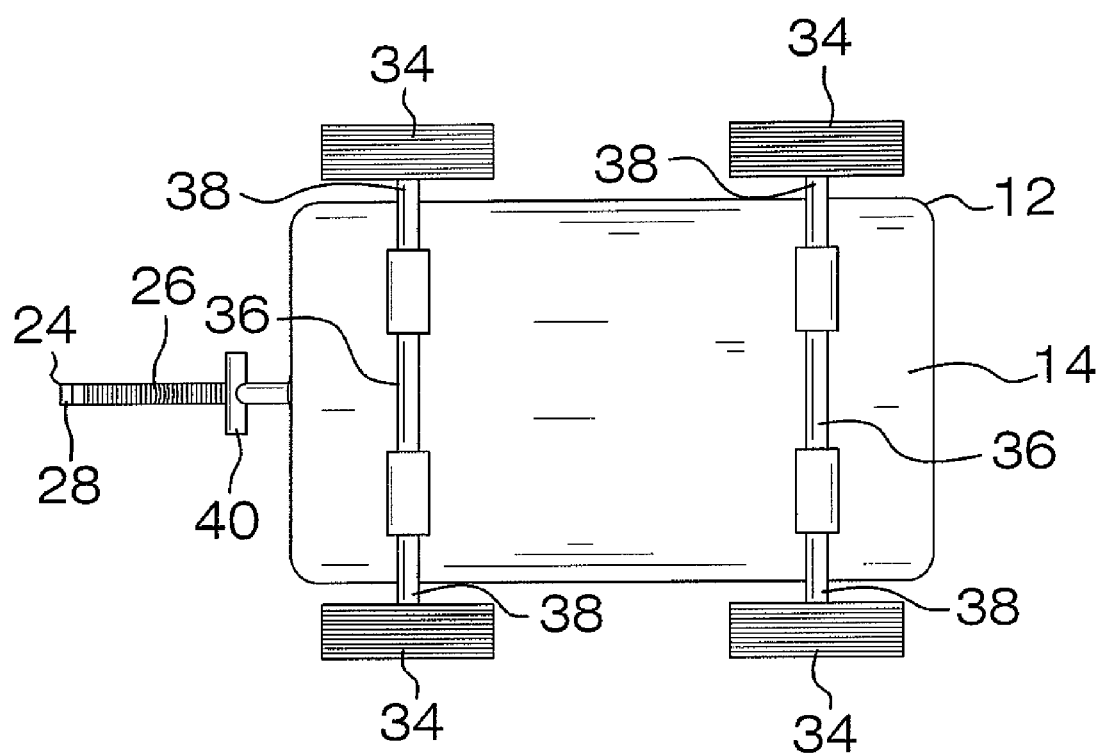
FIG. 4 is a bottom view of the present invention.

With reference now to the drawings, and in particular to FIGS. 1 through 4 thereof, a new tool box embodying the principles and concepts of the present invention and generally designated by the reference numeral 10 will be described.

As best illustrated in FIGS. 1 through 4, the portable tool box 10 generally comprises a container 12 receiving tools to be transported. The container 12 includes a base wall 14 and a perimeter wall 16 extending upwardly from the base wall 14 to define an interior space 18 of the container 12. The interior space 18 of the container 12 receives the tools when the tools are positioned in the container 12. A top edge 20 of the base wall 14 defines an open end 22 of the container 12. The container 12 has a length of approximately 18 inches and a width of approximately 14 inches.

A light assembly 24 is coupled to the container 12. The light assembly 24 has a neck 26 extending outwardly from the container 12. The neck 26 is resiliently flexible to permit selective positioning of the light assembly 24 to illuminate a desired area. The neck 26 terminates with a light emitter 28. The light assembly 24 is coupled to a front wall 30 of the perimeter wall 16.

A lifting handle 32 is coupled to the container 12. The lifting handle 32 is graspable to permit lifting of the container 12 when the container 12 is to be transported. The lifting handle 32 is telescopic to permit extension of the lifting handle 32 from the container 12. The lifting handle 32 is coupled to the base wall 14 and extends upwardly therefrom, wherein the lifting handle 32 extends through the interior space 18 and through the open end 22 when the lifting handle 32 is extended.

Each of a plurality of wheels 34 is rotatably coupled to the container 12. Each of the wheels 34 rolls across a support surface to facilitate transportation of the container 12 across the support surface. Each of a pair of axles 36 has a pair of the wheels 34 rotatably coupled thereto. Each of the axles 36 is coupled to the base wall 14 of the container 12. The wheels 34 are positioned at opposing ends 38 of the associated one of the axles 36, wherein a width of the container 12 is positioned between an associated pair of the wheels 34. The overall height of the container 12 with the wheels 34 is approximately 12 inches.

A towing handle 40 is coupled to and extending outwardly from the container 12. The towing handle 40 is graspable to push and pull the container 12 across the support surface. The towing handle 40 is telescope to permit the towing handle 40 to be selectively extended from the container 12. The towing handle 40 is coupled to the front wall 30 of the perimeter wall 16 adjacent the base wall 14.

In use, the tools are placed into the container 12. The towing handle 40 is grasped to push and pull the container 12 to the desired location. Additionally, the lifting handle 32 can be grasped to lift the container 12 when the wheels 34 are not capable of rolling over the support surface. The neck 26 of the light assembly 24 is adjusted to position the light emitter 28 to emit light at the desired area to help illuminate the area where work is to be done.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable tool box for transporting tools to a work site, said tool box comprising;
   a container receiving the tools to be transported, said container including a base wall and a perimeter wall extending upwardly from said base wall to define an interior space of said container, said interior space of said container receiving the tools when said tools are positioned in said container, a top edge of said base wall defining an open end of said container;
   a lifting handle being coupled to said container, said lifting handle being graspable to permit lifting of said container when said container is to be transported, said lifting handle being positioned within said container, said lifting handle being spaced from said perimeter wall;
   a plurality of wheels, each of said wheels being rotatably coupled to said base wall of said container, each of said wheels rolling across a support surface to facilitate transportation of said container across the support surface; and
   a light assembly being abutting and being coupled to said perimeter wall of said container.

2. The system according to claim 1, wherein said light assembly has a neck extending outwardly from said container, said neck being resiliently flexible to permit selective positioning of said light assembly to illuminate a desired area.

3. The system according to claim 2, wherein said neck terminates with a light emitter.

4. The system according to claim 1, wherein said light assembly is coupled to a front wall of said perimeter wall.

5. The system according to claim 1, wherein said lifting handle is telescopic to permit extension of said lifting handle from said container.

6. The system according to claim 5, wherein said lifting handle is coupled to said base wall and extends upwardly therefrom, wherein said lifting handle extends through said interior space and through said open end when said lifting handle is extended.

7. The system according to claim 1, further comprising each of a pair of axles having a pair of said wheels rotatably coupled thereto, each of said axles being coupled to said base wall of said container, said wheels being positioned at opposing ends of the associated one of said axles, wherein a width of said container is positioned between an associated pair of said wheels.

8. The system according to claim 1, further comprising a towing handle being coupled to and extending outwardly from said container, said towing handle being graspable to push and pull said container across the support surface.

9. The system according to claim 8, wherein said towing handle is telescopic to permit said towing handle to be selectively extended from said container, said towing handle being coupled to a front wall of said perimeter wall adjacent said base wall.

10. A portable tool box for transporting tools to a work site, said tool box comprising;
   a container receiving the tools to be transported, said container including a base wall and a perimeter wall extending upwardly from said base wall to define an interior space of said container, said interior space of said container receiving the tools when said tools are positioned in said container, a top edge of said base wall defining an open end of said container;
   a light assembly being coupled to said container, said light assembly having a neck extending outwardly from said container, said neck being resiliently flexible to permit selective positioning of said light assembly to illuminate a desired area, said neck terminating with a light emitter, said light assembly being coupled to a front wall of said perimeter wall;
   a lifting handle being coupled to said container, said lifting handle being graspable to permit lifting of said container when said container is to be transported, said lifting handle being telescopic to permit extension of said lifting handle from said container, said lifting handle being coupled to said base wall and extending upwardly therefrom, wherein said lifting handle extends through said interior space and through said open end when said lifting handle is extended, said lifting handle being positioned within said container and spaced from said perimeter wall;
   a plurality of wheels, each of said wheels being rotatably coupled to said container, each of said wheels rolling across a support surface to facilitate transportation of said container across the support surface, each of a pair of axles having a pair of said wheels rotatably coupled thereto, each of said axles being coupled to said base wall of said container, said wheels being positioned at opposing ends of the associated one of said axles, wherein a width of said container is positioned between an associated pair of said wheels; and
   a towing handle being coupled to and extending outwardly from said container, said towing handle being graspable to push and pull said container across the support surface, said towing handle being telescope to permit said towing handle to be selectively extended from said container, said towing handle being coupled to said front wall of said perimeter wall adjacent said base wall.

* * * * *